(12) United States Patent
Minami et al.

(10) Patent No.: US 9,768,993 B2
(45) Date of Patent: Sep. 19, 2017

(54) MULTIBAND EQUALIZER, ERROR RATE MEASUREMENT SYSTEM USING THE SAME, ERROR RATE MEASUREMENT DEVICE, AND PATH SELECTION METHOD

(71) Applicant: Anritsu Corporation, Kanagawa (JP)

(72) Inventors: Takanari Minami, Kanagawa (JP); Sumio Saito, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 15/292,846

(22) Filed: Oct. 13, 2016

(65) Prior Publication Data
US 2017/0171001 A1 Jun. 15, 2017

(30) Foreign Application Priority Data
Dec. 11, 2015 (JP) .................................. 2015-242306

(51) Int. Cl.
| H03H 7/30 | (2006.01) |
|---|---|
| H03H 7/40 | (2006.01) |
| H03K 5/159 | (2006.01) |
| H04L 27/01 | (2006.01) |

(Continued)

(52) U.S. Cl.
CPC .............. *H04L 27/01* (2013.01); *H04L 1/242* (2013.01); *H04L 45/14* (2013.01)

(58) Field of Classification Search
CPC .... H04B 14/068; H04B 14/046; H04B 3/141; H04B 3/145; H04B 3/04; H03M 3/042; H04L 25/0272; H04L 25/03038; H04L 25/03057; H04L 2025/03617;

(Continued)

(56) References Cited

U.S. PATENT DOCUMENTS

| 4,839,905 A * | 6/1989 | Mantovani ........ H04L 25/03019 |
| | | 333/18 |
| 5,055,795 A * | 10/1991 | Kasper .............. H04L 25/03038 |
| | | 330/149 |

(Continued)

FOREIGN PATENT DOCUMENTS

| JP | 3584893 B2 | 11/2004 |
| JP | 5531662 B2 | 6/2014 |
| JP | 2015-115787 A | 6/2015 |

*Primary Examiner* — James M Perez
(74) *Attorney, Agent, or Firm* — Pearne & Gordon LLP

(57) ABSTRACT

A plurality of high-frequency components 12 that are provided in parallel between an input-side transmission circuit 10 and an output-side transmission circuit 11 and have pass characteristics different from each other are included, each high-frequency component 12 includes a power supply terminal 17 to which a driving power supply signal is selectively input, a signal transmitted through the input-side transmission circuit 10 is transmitted to the output-side transmission circuit 11 via a transmission path including only the high-frequency component in which the driving power supply signal is input to the power supply terminal 17 among the plurality of high-frequency components 12, and at least one of the plurality of high-frequency components 12 function as an equalizer that changes a frequency characteristic of the signal input to the input-side transmission circuit 10 due to the driving power supply signal being input to the power supply terminal 17.

7 Claims, 9 Drawing Sheets

(51) Int. Cl.
*H04L 1/24* (2006.01)
*H04L 12/721* (2013.01)

(58) Field of Classification Search
CPC .... H04L 2025/03477; H04L 25/03133; H04M 1/725; H03H 21/0012
USPC ............... 375/219–236, 259–285, 295–352; 333/17.1–17.3, 18
See application file for complete search history.

(56) References Cited

U.S. PATENT DOCUMENTS

| | | | | |
|---|---|---|---|---|
| 5,124,673 | A * | 6/1992 | Hershberger | H03G 3/3068 333/18 |
| 5,210,712 | A * | 5/1993 | Saito | H03K 5/003 708/819 |
| 5,682,125 | A * | 10/1997 | Minuhin | G11B 20/10009 333/166 |
| 6,531,931 | B1 * | 3/2003 | Benyamin | H04L 25/03885 330/304 |
| 7,145,971 | B2 * | 12/2006 | Raleigh | H04B 7/0615 375/347 |
| 7,173,966 | B2 * | 2/2007 | Miller | H04K 1/00 375/229 |
| 7,263,133 | B1 * | 8/2007 | Miao | H04B 1/71632 370/208 |
| 7,289,557 | B2 * | 10/2007 | Balamurugan | H03H 21/0043 333/18 |
| 7,405,770 | B1 * | 7/2008 | Gudmunson | H04N 5/21 348/470 |
| 7,406,141 | B1 * | 7/2008 | Peeters | H04L 27/2653 375/229 |
| 8,654,884 | B2 * | 2/2014 | Kerr | H04L 25/03057 375/254 |
| 8,680,937 | B2 * | 3/2014 | Chang | H03H 7/40 333/18 |
| 2002/0163384 | A1 * | 11/2002 | Hasegawa | H03F 3/45071 330/258 |
| 2003/0016772 | A1 * | 1/2003 | Ekstrand | H03H 17/0266 375/350 |
| 2007/0018194 | A1 * | 1/2007 | Miki | H03K 17/04123 257/133 |
| 2007/0080854 | A1 * | 4/2007 | Arayashiki | G01S 7/03 342/175 |
| 2008/0007368 | A1 * | 1/2008 | Kalb | H03H 7/40 333/17.3 |
| 2008/0310491 | A1 * | 12/2008 | Abbasfar | H04L 27/0008 375/230 |
| 2009/0110108 | A1 * | 4/2009 | Kennedy | H04B 1/71635 375/295 |
| 2009/0256739 | A1 * | 10/2009 | Teshirogi | G01S 7/032 342/204 |
| 2010/0290515 | A1 * | 11/2010 | Dai | H04L 25/03057 375/232 |
| 2010/0329247 | A1 * | 12/2010 | Kennedy | H04B 1/7163 370/389 |
| 2010/0329319 | A1 * | 12/2010 | Dai | G01R 31/3171 375/224 |
| 2013/0223505 | A1 * | 8/2013 | Cohen | H04L 25/03885 375/232 |
| 2013/0322506 | A1 * | 12/2013 | Zerbe | H04L 1/0026 375/224 |
| 2014/0286384 | A1 * | 9/2014 | Mestre Pons | H04L 27/01 375/232 |
| 2015/0110165 | A1 * | 4/2015 | Ramadoss | H04L 25/03885 375/233 |
| 2015/0171920 | A1 * | 6/2015 | Kameya | H04B 3/14 333/28 R |
| 2016/0357880 | A1 * | 12/2016 | Ishizuka | G06F 17/5009 |

* cited by examiner (a)

(b)

MULTIBAND EQUALIZER, ERROR RATE MEASUREMENT SYSTEM USING THE SAME, ERROR RATE MEASUREMENT DEVICE, AND PATH SELECTION METHOD

TECHNICAL FIELD

The present invention provides a multiband equalizer, an error rate measurement system using the same, an error rate measurement device, and a path selection method.

BACKGROUND ART

In recent years, with increasing performance of electronic devices or communication devices, the speed of serial transmission between devices has continued to increase. When the quality of a device supporting such high-speed serial transmission is evaluated, it is necessary to transmit a digital signal at a high bit rate to a measurement device while suppressing deterioration of a waveform.

For example, a device that measures an error rate of a digital signal transmits and receives a high-speed pulse pattern signal such as a pseudo-random bit sequence to and from a device under test (DUT) via a transmission line.

A transmission line functions as a low pass filter with respect to a high-speed signal to greatly attenuate high-frequency components of a signal that is propagated via the transmission line. Therefore, a technology for lifting up the high-frequency components relative to low-frequency components using an equalizer in order to compensate for the high-frequency components lost due to low-pass filter characteristics of the transmission line is conventionally known (for example, see Patent Document 1).

However, the equalizer disclosed in Patent Document 1 is unable to support a wide range of bit rate since the equalizer is a passive equalizer. Therefore, when signals at various bit rates output from the DUT are measured, a plurality of equalizers having pass characteristics according to the bit rates are prepared and required to be switched between and attached to a measurement device one by one.

A method of configuring a plurality of equalizers having different pass characteristics in parallel using a high-frequency switch (see, for example, Patent Document 2) that switches between and connects a plurality of individual terminals to one common terminal, and switching between a plurality of equalizers may be considered. However, since the switching element is used in the high-frequency switch disclosed in Patent Document 2, an insertion loss is caused by this switching element.

Meanwhile, an equalizer capable of changing a peak frequency of equalizer characteristics without using a switching element has been proposed (see, for example, Patent Document 3).

RELATED ART DOCUMENT

Patent Document

[Patent Document 1] JP-A-2015-115787
[Patent Document 2] Japanese Patent No. 5531662
[Patent Document 3] Japanese Patent No. 3584893

DISCLOSURE OF THE INVENTION

Problem that the Invention is to Solve

However, even in the equalizer capable of changing the peak frequency of the equalizer characteristics as disclosed in Patent Document 3, for example, there is a problem in that it is technically difficult for the peak frequency to be changed over a wide band such as 2 GHz to 16 GHz. Further, as described above, the equalizer disclosed in Patent Document 1 has a problem in that it is difficult to support a wide range of bit rate. Further, in the high-frequency switch disclosed in Patent Document 2, there is a problem in that the insertion loss due to the switching element cannot be avoided.

The present invention has been made to solve such conventional problems, and an object thereof is to provide a multiband equalizer supporting a low loss and a wide range of bit rate, an error rate measurement system using the same, an error rate measurement device, and a path selection method.

Means for Solving the Problem

In order to solve the above problem, a multiband equalizer of claim 1 of the present invention includes an input-side transmission circuit having one end at which an input terminal to which a signal is input is formed, and the other end terminated by the input-side termination circuit; an output-side transmission circuit having one end terminated by an output-side termination circuit and the other end at which an output terminal for outputting a signal is formed; and a plurality of high-frequency components that are provided in parallel between the input-side transmission circuit and the output-side transmission circuit and have pass characteristics different from each other, in which each high-frequency component includes a power supply terminal to which a driving power supply signal is input from an external power supply circuit, and a signal transmitted through the input-side transmission circuit is transmitted to the output-side transmission circuit via a transmission path including only a high-frequency component in which the driving power supply signal is input to the power supply terminal among the plurality of high-frequency components.

Further, in the multiband equalizer of claim 2 of the present invention, at least one of the plurality of high-frequency components functions as an equalizer that changes frequency characteristics of the signal input from the input terminal due to the driving power supply signal being input to the power supply terminal thereof.

With this configuration, it is possible to switch the plurality of transmission paths each including the high-frequency component with a low loss without using a switch that may be a loss source by individually inputting the driving power supply signal to power supply terminals of the plurality of high-frequency components having pass characteristics different from each other. Accordingly, it is possible to realize a multiband equalizer supporting a low loss and a wide range of bit rate.

Further, in the multiband equalizer of claim 3 of the present invention, one of the plurality of high-frequency components functions as an amplifier that amplifies a signal input from the input terminal with flat frequency characteristics.

With this configuration, it is possible to realize a through-characteristic in which a transmission loss is small, by inputting the driving power supply signal to the power supply terminal of the high-frequency component that amplifies an input signal with flat frequency characteristics.

Further, in the multiband equalizer of claim 4 of the present invention, the high-frequency component functioning as an equalizer may include a continuous time linear equalizer (CTLE).

Further, an error rate measurement system of claim 5 of the present invention includes the multiband equalizer; a pulse pattern generation device that generates a pulse pattern and inputs the pulse pattern as a test signal to a target under test; and an error rate measurement device that is disposed at a stage subsequent to the multiband equalizer, and compares a measured signal from the target under test due to an input of the test signal with the test signal to measure an error rate of the measured signal, in which the error rate measurement device includes a power supply circuit that inputs a driving power supply signal to the plurality of power supply terminals of the multiband equalizer, and the measured signal is input to the error rate measurement device via the high-frequency component in which the driving power supply signal is input to the power supply terminal among the plurality of high-frequency components.

With this configuration, since a transmission path including a suitable high-frequency component may be selected with a low loss according to the measured signal output from the target under test, it is possible to accurately execute error rate measurement for the measured signal at a wide range of bit rate.

Further, an error rate measurement device according to claim 6 of the present invention includes: the multiband equalizer; an error rate measurement unit that is disposed at a subsequent stage of the multiband equalizer, and compares a measured signal from the target under test due to an input of a pulse pattern as a test signal with the test signal to measure an error rate of the measured signal; and a power supply circuit that inputs a driving power supply signal to the plurality of power supply terminals of the multiband equalizer, in which the measured signal is input to the error rate measurement unit via the high-frequency component in which the driving power supply signal is input to the power supply terminal among the plurality of high-frequency components.

With this configuration, since a transmission path including a suitable high-frequency component may be selected with a low loss according to the measured signal output from the target under test, it is possible to accurately execute error rate measurement for the measured signal at a wide range of bit rate.

Further, a path selection method according to claim 7 of the present invention is a path selection method using any one of the multiband equalizers, including a step of selecting at least one high-frequency component from among the plurality of high-frequency components of the multiband equalizer; and a step of inputting a driving power supply signal to the power supply terminal that the high-frequency component selected in the above step has.

With this configuration, it is possible to switch between the plurality of transmission paths each including the high-frequency component having a different characteristic with a low loss without using a switch that may be a loss source.

Advantage of the Invention

The present invention provides a multiband equalizer supporting a low loss and a wide range of bit rate, an error rate measurement system using the same, an error rate measurement device, and a path selection method.

BEST MODE FOR CARRYING OUT THE INVENTION

Hereinafter, embodiments of a multiband equalizer, an error rate measurement system using the same, an error rate measurement device, and a path selection method according to the present invention will be described with reference to the accompanying drawings.

First Embodiment

Figure 1:
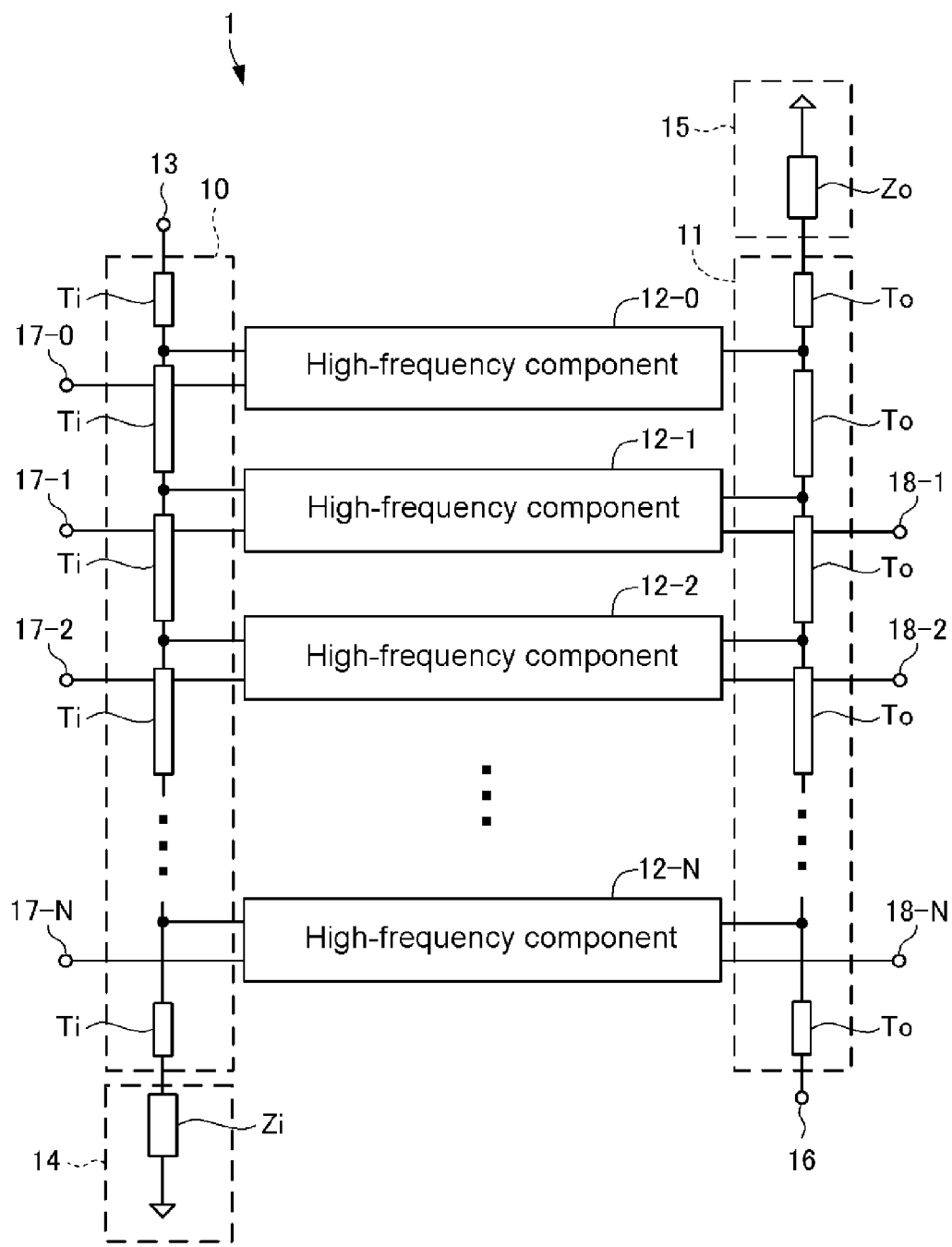
FIG. 1 is a block diagram illustrating a configuration of a multiband equalizer according to a first embodiment.

As illustrated in FIG. 1, a multiband equalizer 1 according to this embodiment includes a plurality of high-frequency components 12-0 to 12-N that are provided in parallel between an input-side transmission circuit 10 and an output-side transmission circuit 11 and have pass characteristics different from each other.

The input-side transmission circuit 10 includes an input-side transmission line in which a plurality of transmission lines Ti are connected in series, and is formed of inductance components of the transmission lines Ti and input capacitance of each high-frequency component 12. Further, an input terminal 13 to which a signal is input is formed at one end of the input-side transmission line, and The other end thereof is terminated by an input-side termination circuit 14. Characteristic impedance Zi of the input-side termination circuit 14 matches with characteristic impedance of the input-side transmission circuit 10.

The output-side transmission circuit 11 includes an output-side transmission line in which a plurality of transmission lines To are connected in series, and is formed of inductance components of the transmission lines To and output capacitance of each high-frequency component 12. Further, one end of the output-side transmission line is terminated by an output-side termination circuit 15, and an output terminal 16 for outputting a signal is formed at the other end thereof. Characteristic impedance Zo of the output-side termination circuit 15 matches characteristic impedance of the output-side transmission circuit 11.

In the plurality of transmission lines Ti constituting the input-side transmission circuit 10, a line length and the characteristic impedance are designed to be optimal, and a return loss on the input side is designed to be high. In the plurality of transmission lines To of the output-side transmission circuit 11, a return loss is similarly designed to be high. Such a design method is known as a design method for a traveling wave amplifier. However, input capacitance and output capacitance of each of the high-frequency components 12 may be not the same as input capacitance and output capacitance of the other high-frequency components, and this configuration is different from a configuration of a traveling wave amplifier of the related art in this regard.

A line length of the two transmission lines respectively located closest to the input terminals 13 and the input-side termination circuit 14 among the plurality of transmission lines Ti constituting the input-side transmission circuit 10 is ½ of the line length of the other transmission line Ti. Further, a line length of the two transmission lines respectively located closest to the output-side termination circuit 15 and the output terminal among the plurality of transmission lines To constituting the output-side transmission circuit 11 is ½ of the line length of the other transmission line To.

The input-side transmission circuit 10, the output-side transmission circuit 11, and the plurality of high-frequency components 12 may be configured for a single-ended input and output or may be configured for a differential input and output. The transmission lines Ti and To are configured as, for example, a grounded coplanar line or a grounded coplanar differential line.

Each high-frequency component 12 includes a power supply terminal 17 for supplying a driving power supply signal to a transistor constituting the high-frequency component 12. Here, in a case where the high-frequency component 12 is a voltage-controlled component, the driving power supply signal is a voltage signal (bias voltage). Further, in a case where the high-frequency component 12 is a current-controlled component, the driving power supply signal is a current signal (bias current).

The power supply terminal 17 is connected to an external power supply circuit, and a driving power supply signal is selectively input from the power supply circuit. Hereinafter, a state of the high-frequency component 12 of which the driving power supply signal is input to the power supply terminal 17 is referred to as "power on", and a state of the high-frequency component 12 of which the driving power supply signal is not input to the power supply terminal 17 is referred to as "power off".

That is, in the multiband equalizer 1 of this embodiment, a signal transmitted through the input-side transmission circuit 10 is transmitted the output-side transmission circuit 11 via a transmission path including only the high-frequency component in the power-on state among the plurality of high-frequency components 12. On the other hand, the high-frequency component 12 in the power-off state does not transmit the signal transmitted through the input-side transmission circuit 10 to the output-side transmission circuit 11.

The number of high-frequency components 12 that simultaneously enter a power-on state may be 1 or may be 2 or more. Further, each high-frequency component 12 may have a control terminal 18 for changing the pass characteristic of the high-frequency component 12.

At least one of the plurality of high-frequency components 12 include, for example, a continuous time linear equalizer (CTLE), and function as an equalizer that changes the frequency characteristic of the signal input from the input terminal 13 due to the driving power supply signal being input to the power supply terminal 17.

Further, one of the plurality of high-frequency components 12 functions as an amplifier that amplifies the signal input from the input terminal 13 with a flat frequency characteristic. Such a high-frequency component can realize a through-characteristic in which a transmission loss is small.

Further, the high-frequency component 12 is not limited to a high-frequency component including a CTLE, and may be a high-frequency component including a low pass filter, a band pass filter, or a high pass filter.

Hereinafter, a result of simulation of the pass characteristic of the multiband equalizer 1 will be described with reference to an equivalent circuit illustrated in FIG. 2.

Figure 2:
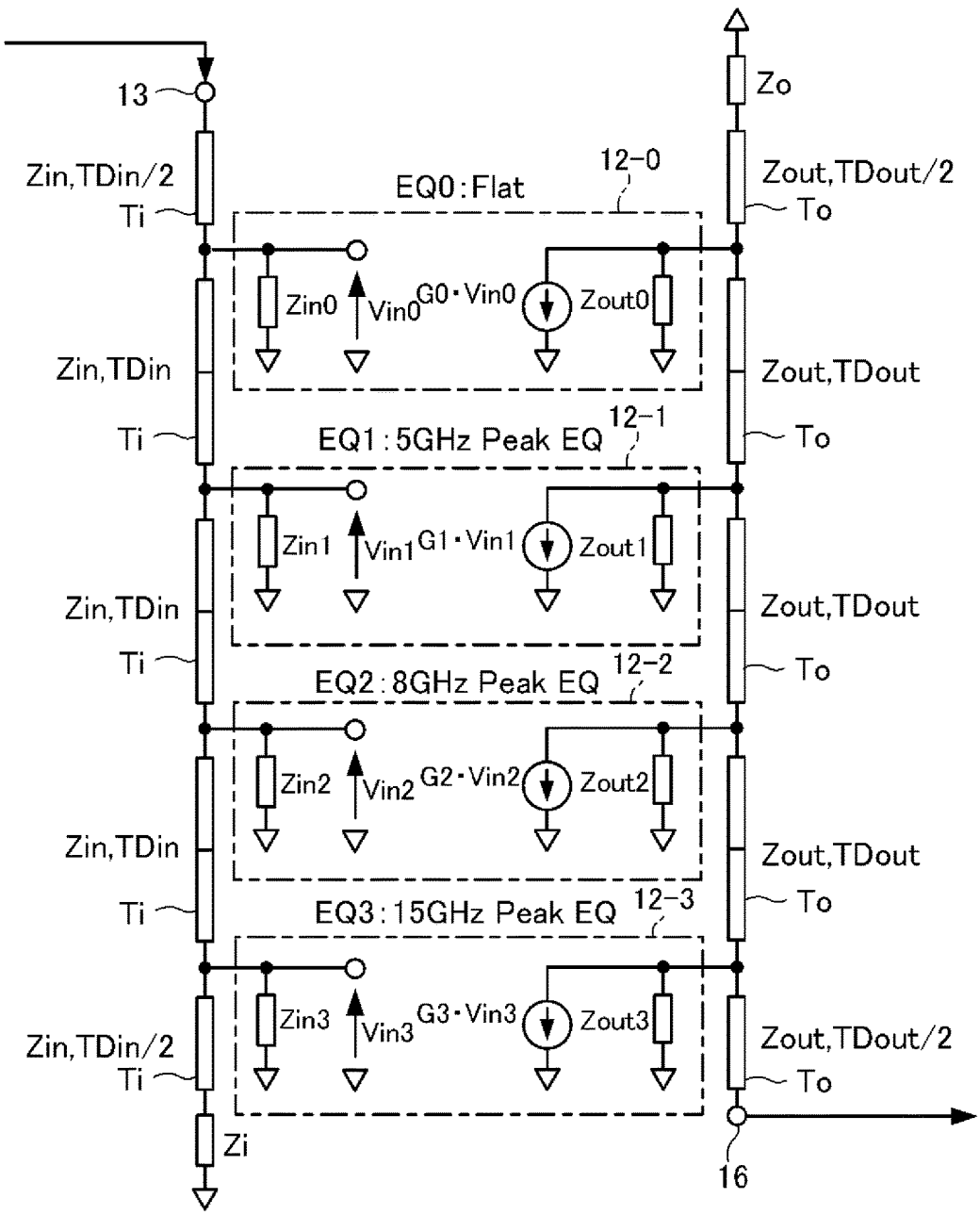
FIG. 2 is a circuit diagram illustrating an equivalent circuit of the multiband equalizer according to the first embodiment.

In the equivalent circuit of FIG. 2, there are four high-frequency components 12, which are respectively referred to as EQ0, EQ1, EQ2, and EQ3. The pass characteristic of EQ0 is flat. The pass characteristics of EQ1 to EQ3 have peaks at 5 GHz, 8 GHz, and 15 GHz, respectively.

Here, EQ0 to EQ3 are considered as voltage controlled current sources having different pass characteristics. However, the present invention is not limited thereto, and the high-frequency component 12 may be a current controlled high-frequency component or a voltage controlled high-frequency component. Further, the high-frequency component 12 may be a current source or a voltage source.

Figure 3:
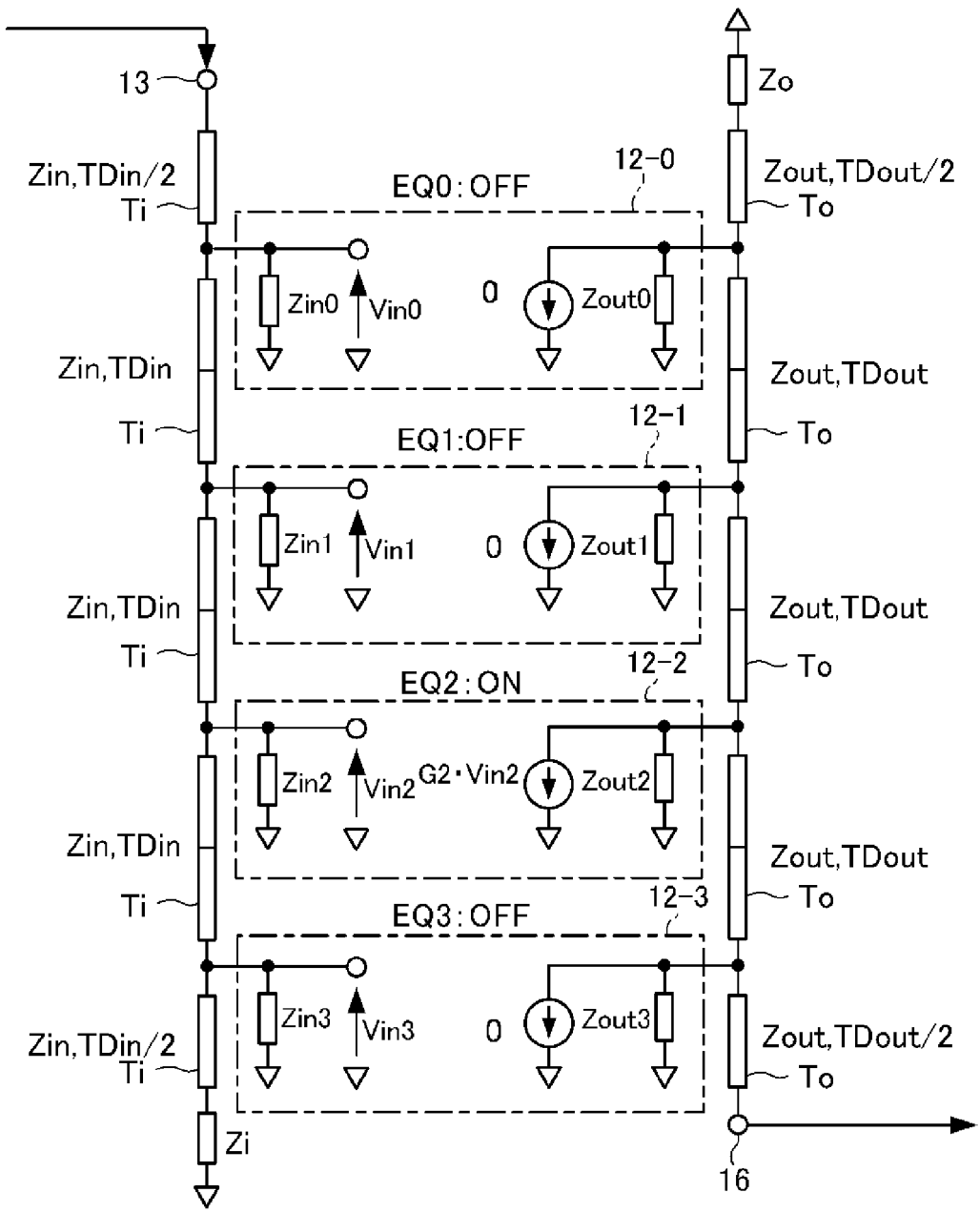
FIG. 3 is a diagram illustrating power-off and power-on states in the equivalent circuit of the multiband equalizer according to the first embodiment.

In the following simulation, power-off of EQ0 to EQ 3 is represented by respective transfer conductances G0 to G3 that are 0. For example, as illustrated in FIG. 3, when only EQ2 among EQ0 to EQ3 is powered on and a transmission path including EQ2 is selected, an output side of EQ0, EQ1, and EQ3 is represented as a current source having current of 0.

Further, as simulation conditions, input capacitance and output capacitance of EQ0 to EQ 3 are given as follows.

Capacitance (input capacitance) of Zin0 to Zin3 on the input side: 10 fF

Capacitance (output capacitance) of Zout0 on the output side: 24 fF

Capacitance (output capacitance) of Zout1 on the output side: 28.8 fF

Capacitance (output capacitance) of Zout2 on the output side: 13 fF

Capacitance (output capacitance) of Zout3 on the output side: 15 fF

Figure 4:
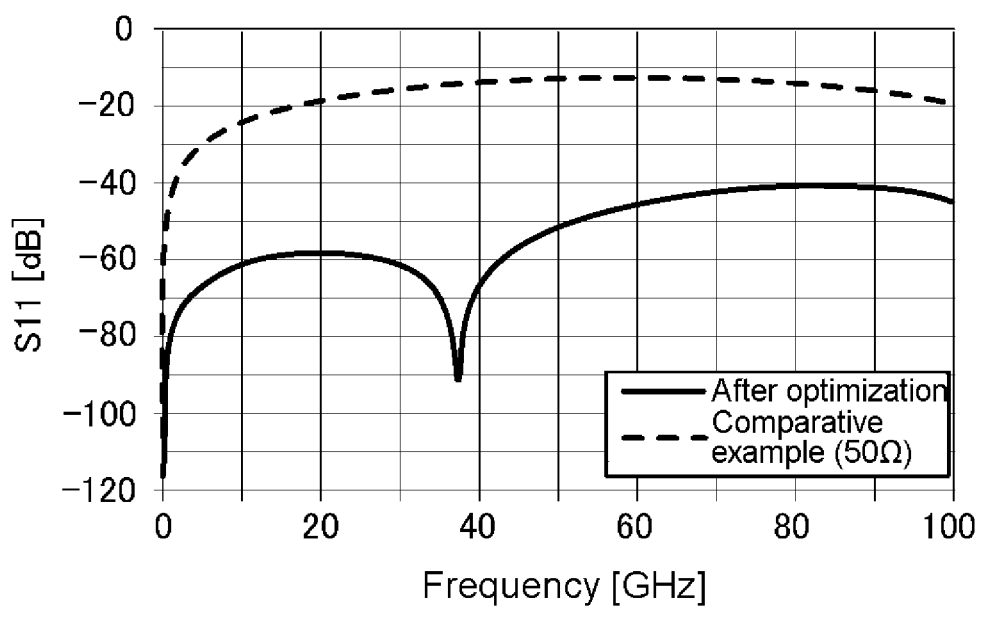
FIG. 4 is a graph illustrating a result of simulation of S11 and S22 in the equivalent circuit of the multiband equalizer according to the first embodiment.
Figure 4:
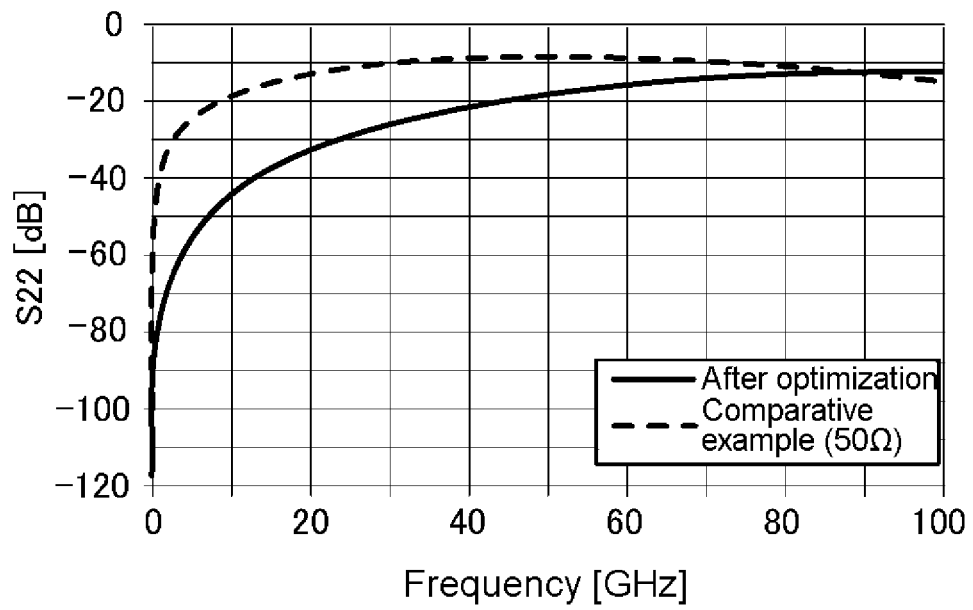
Figure 5:
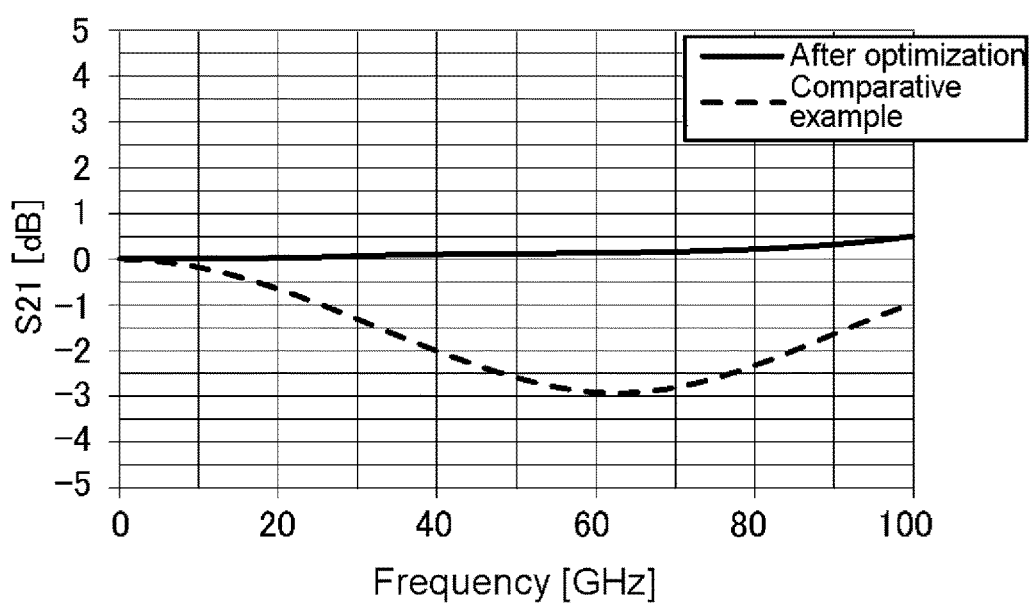
FIG. 5 is a graph illustrating a result of simulation of S21 in the equivalent circuit of the multiband equalizer according to the first embodiment.

Data (comparative example) of dotted lines in FIGS. 4A and 4B and FIG. 5 show examples of results of simulation when both of characteristic impedance Zin of the transmission line Ti on the input side and characteristic impedance Zout of the transmission line To on the output side are 50Ω, in addition to the above simulation conditions. FIGS. 4A and 4B illustrate frequency characteristics of S parameters S11 and S22. Further, FIG. 5 illustrates a frequency characteristic of an S parameter S21 (insertion loss).

Meanwhile, data of solid lines in FIGS. 4A and 4B and FIG. 5 show results of simulation when the characteristic impedances Zin and Zout, a delay amount (delay time) TDin of the transmission line Ti on the input side, and a delay amount (delay time) TDout of the transmission line To on the output side are designed so that the return losses (S11 and S22) are optimal. Values of Zin, Zout, TDin, and TDout in this case are as follows.

A characteristic impedance Zin of the transmission line Ti on the input side: 67.1Ω

A delay amount TDin of the transmission line Ti on the input side: 0.85 ps

A characteristic impedance Zout of the transmission line To on the output side: 87.4Ω

A delay amount TDout of the transmission line To on the output side: 0.85 ps

A delay amount of the two transmission lines Ti respectively located closest to the input terminal 13 and the input-side termination circuit 14 is TDin/2. Similarly, a delay amount of the two transmission lines To respective located closest to the output terminal 16 and the output-side termination circuit 15 is the TDout/2.

It can be seen from the results of simulation of FIGS. 4 and 5 that it is possible to improve a return loss and an insertion loss in the multiband equalizer 1 of this embodiment by designing the circuit using appropriate values as Zin, Zout, TDin, and TDout according to the input capacitance and the output capacitance of EQ0 to EQ3.

Figure 6:
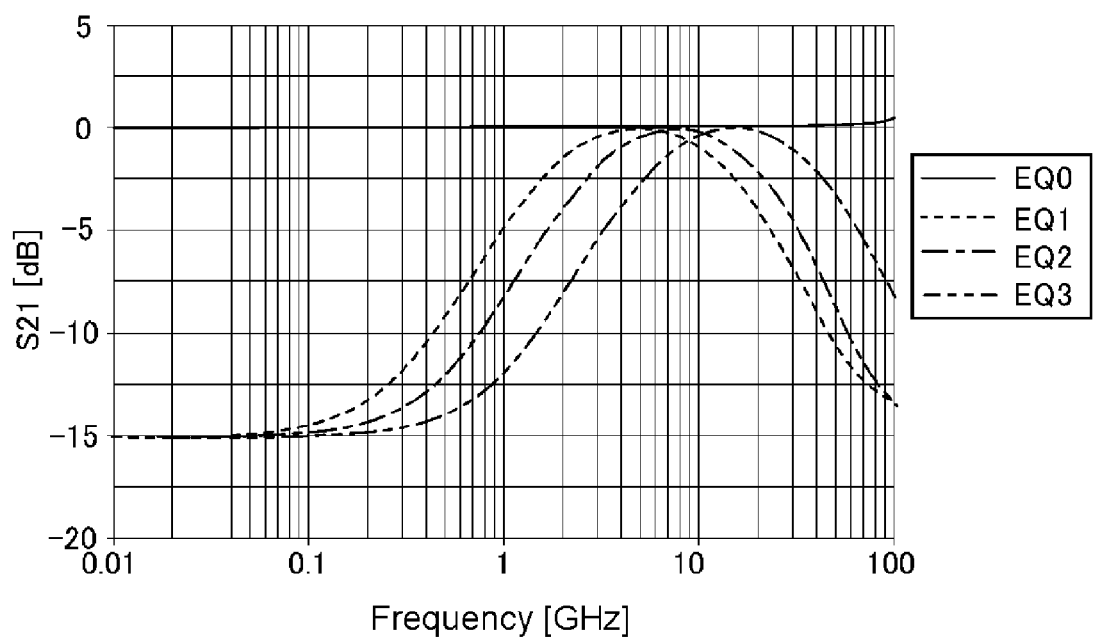
FIG. 6 is a graph illustrating a result of simulation of S21 of each high-frequency component in the equivalent circuit of the multiband equalizer according to the first embodiment.

FIG. 6 is a graph illustrating a frequency characteristic of S21 in each high-frequency component when respective EQ0 to EQ3 are powered on one by one in the equivalent circuit of FIG. 2 optimized as described above.

A solid line indicates S21 when only EQ0 is powered on, and a flat pass characteristic of EQ0 can be confirmed. A dotted line indicates S21 when only EQ1 is powered on, and a pass characteristic having a peak at 5 GHz can be confirmed. An alternate long and short dash line indicates S21 when only EQ2 is powered on, and a pass characteristic having a peak at 8 GHz can be confirmed. A two-dot chain line indicates S21 when only EQ3 is powered on, and a pass characteristic having a peak at 15 GHz can be confirmed.

Thus, by switching the transmission path including each high-frequency component, it is possible to individually use the pass characteristic of each high-frequency component. It is also possible to add up a pass characteristic of a plurality of high-frequency components by simultaneously powering on the plurality of high-frequency components among EQ0 to EQ3.

As described above, the multiband equalizer 1 according to this embodiment has a configuration in which a plurality of CTLEs are included as the high-frequency component 12 for each bitrate and a driving power supply signal can be individually input to power supply terminals thereof. Accordingly, since the plurality of transmission paths each including the high-frequency component 12 can be switched with a low loss without using a switch that may be a loss source, it is possible to realize a multiband equalizer supporting a low loss and a wide range of bit rate.

Further, the multiband equalizer 1 according to this embodiment includes the wideband amplifier that amplifies an input signal with a flat frequency characteristic, as the high-frequency component 12. Thus, it is possible to select a through-characteristic without passing through a CTLE, and realize a multiband equalizer supporting a low loss and a wide range of bit rate.

Second Embodiment

Figure 7:
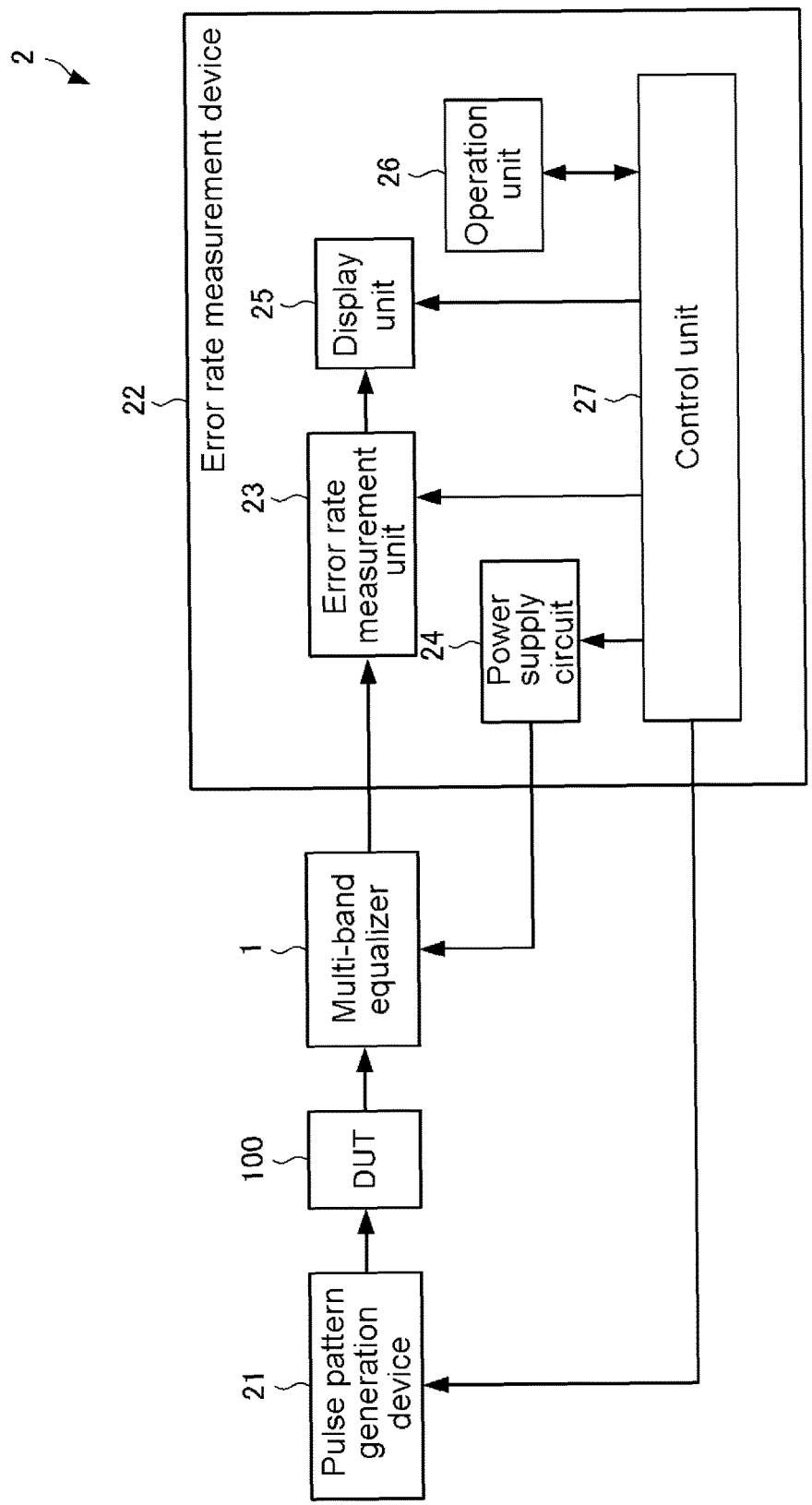
FIG. 7 is a block diagram illustrating a configuration of an error rate measurement system according to a second embodiment.

FIG. 7 illustrates an error rate measurement system according to a second embodiment including the multiband equalizer according to the first embodiment. As illustrated in FIG. 7, the error rate measurement system 2 according to this embodiment includes a multiband equalizer 1, a pulse pattern generation device 21, and an error rate measurement device 22.

The pulse pattern generation device 21 generates a pulse pattern such as a pseudo-random bit sequence having a bit period of 2N−1, and inputs the pulse pattern as a test signal to an under test (DUT) 100.

The DUT 100 is arranged to output a measured signal due to the input of the test signal to the error rate measurement device 22 via the multiband equalizer 1. Examples of a standards supported by the DUT 100 may include PCI Express (registered trademark), USB (registered trademark), Common Electrical Interface (CEI), Ethernet (registered trademark), and InfiniBand.

The error rate measurement device 22 is disposed at a subsequent stage of the multiband equalizer 1, and includes an error rate measurement unit 23, a power supply circuit 24, a display unit 25, an operation unit 26, and a control unit 27.

The error rate measurement unit 23 compares the measured signal passing through the multiband equalizer 1 with the test signal, and measures a bit error rate of the measured signal.

The power supply circuit 24 can selectively input the driving power supply signal to the plurality of power supply terminals 17-0 to 17-N of the multiband equalizer 1. Thus, the measured signal is input to the error rate measurement unit 23 of the error rate measurement device via a transmission path including only the high-frequency component in which the driving power supply signal is input to the power supply terminal 17 among the plurality of high-frequency components 12.

For example, when the driving power supply signal is input to the power supply terminal 17 of the high-frequency component 12 functioning as an equalizer, it is possible to open an eye pattern deteriorated due to a transmission loss. Further, when the driving power supply signal is input to the power supply terminal 17 of the high-frequency component 12 realizing a low loss through-characteristic, it is possible to measure the measured signal from the DUT 100 with high sensitivity.

The display unit 25 includes, for example, a display device such as an LCD or a CRT and displays various types of display content according to a control signal from the control unit 27. A result of measuring a bit error rate of the measured signal, or the like is included in the display content. Further, the display unit 25 may display an operation target, such as soft keys, pull-down menus, or a text box for setting measurement conditions or the like.

The operation unit 26 includes an input device such as a keyboard, a touch panel, or a mouse. Alternatively, as described above, the operation unit 26 may have a configuration in which operation targets such as soft keys, pull-down menus, and a text box are displayed on the display unit 25.

The control unit 27 is configured as, for example, a microcomputer including a CPU, a ROM, RAM, and a HDD, and controls operations of the respective units constituting the pulse pattern generation device 21 and the error rate measurement device 22.

Although the pulse pattern generation device 21 is configured as a body separate from the error rate measurement device 22 in the example of FIG. 7, the pulse pattern generation device 21 may be configured integrally with the error rate measurement device 22.

Figure 8:
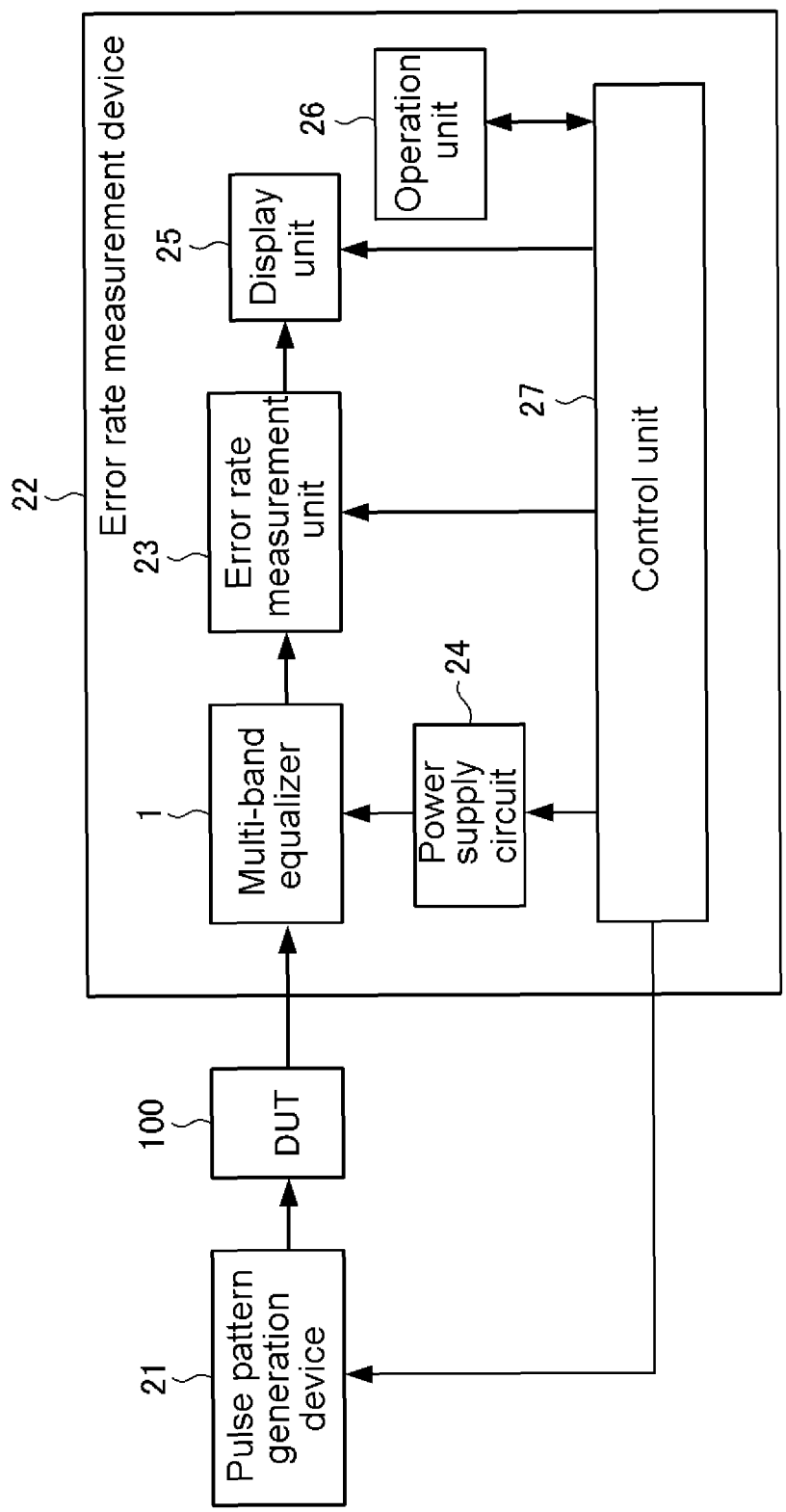
FIG. 8 is a block diagram illustrating another configuration of an error rate measurement device included in the error rate measurement system according to the second embodiment.

Further, as illustrated in FIG. 8, the error rate measurement device 22 may include a built-in multiband equalizer 1, in addition to the error rate measurement unit 23, the power supply circuit 24, the display unit 25, the operation unit 26, and the control unit 27. In this case, the error rate measurement unit 23 is disposed at a subsequent stage of the multiband equalizer 1.

Figure 9:
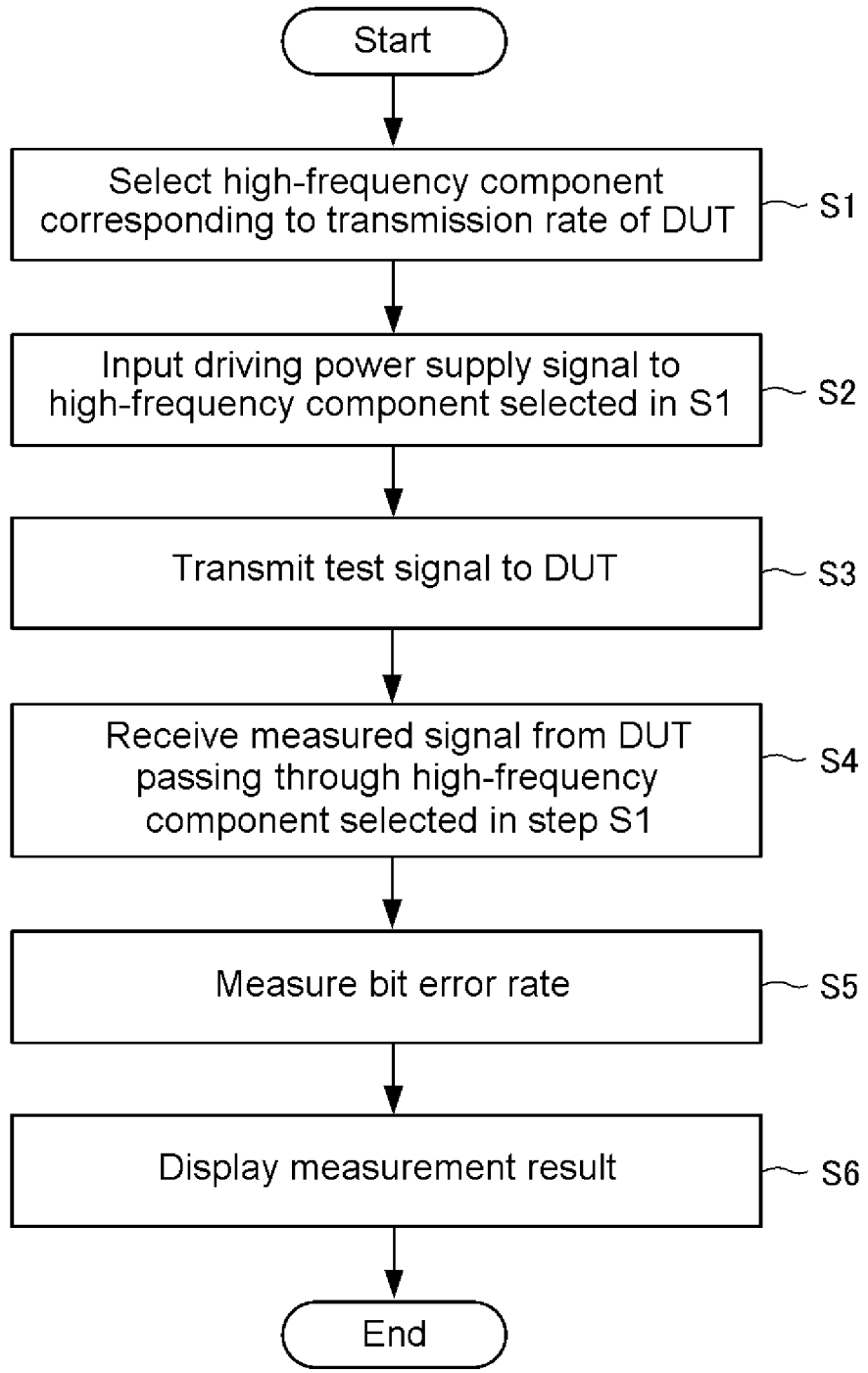
FIG. 9 is a flowchart illustrating a process of a path selection method in the error rate measurement system according to the second embodiment.

Hereinafter, a path selection method using the multiband equalizer 1 in the error rate measurement system 2 will be described with reference to the flowchart of FIG. 9.

First, at least one high-frequency component according to a transmission rate of a standard supported by the DUT 100 is selected from among the plurality of high-frequency components 12 of the multiband equalizer 1 by the user operating the operation unit 26 (step S1).

Next, the power supply circuit 24 inputs a driving power supply signal to the power supply terminal 17 that the high-frequency component 12 selected in step S1 has (step S2).

Then, the pulse pattern generation device 21 generates a pulse pattern as a test signal and transmits the test signal to the DUT 100 (step S3).

Then, the error rate measurement unit 23 receives the measured signal from the DUT 100 passing through the transmission path including the high-frequency component 12 selected in step S1 (step S4).

Then, the error rate measurement unit 23 compares the measured signal received in step S4 with the test signal, and measures the bit error rate of the measured signal (step S5).

Then, the display unit 25 displays a result of measuring the bit error rate of the measured signal (step S5).

As described above, in the error rate measurement system 2 according to this embodiment, since the transmission path including the suitable high-frequency component 12 can be selected with a low loss in software according to the measured signal output from the DUT 100, it is possible to accurately execute error rate measurement for the measured signal in a wide range of bit rate.

DESCRIPTION OF REFERENCE NUMERALS AND SIGNS 1 multiband equalizer
2 error rate measurement system
10 input-side transmission circuit
11 output-side transmission circuit
12, and 12-0 to 12-N high-frequency component
13 input terminal
14 input-side termination circuit
15 output-side termination circuit
16 output terminal
17, and 17-0 to 17-N power supply terminal
18, and 18-0 to 18-N control terminal
21 pulse pattern generation device
22 error rate measurement device
23 error rate measurement unit
24 power supply circuit
25 display unit
26 operation unit
27 control unit
100 DUT (device under test)

The invention claimed is:

1. A multiband equalizer, comprising:
an input-side transmission circuit having one end at which an input terminal to which a signal is input is formed, and the other end terminated by the input-side termination circuit;
an output-side transmission circuit having one end terminated by an output-side termination circuit and the other end at which an output terminal for outputting a signal is formed;
a plurality of high-frequency components that are provided in parallel between the input-side transmission circuit and the output-side transmission circuit and have frequency pass characteristics different from each other, each high-frequency component including a power supply terminal to which a driving power supply signal is selectively input from an external power supply circuit; and
a transmission path that transmits a signal transmitted through the input side transmission circuit to the output side transmission circuit and that includes only the high-frequency component in which the driving power supply signal is input to the power supply terminal among the plurality of high-frequency components.

2. The multiband equalizer according to claim 1, wherein at least one of the plurality of high-frequency components functions as an equalizer that changes frequency characteristics of the signal input from the input terminal due to the driving power supply signal being input to the power supply terminal thereof.

3. The multiband equalizer according to claim 1, wherein one of the plurality of high-frequency components functions as an amplifier that amplifies a signal input from the input terminal with flat frequency characteristics.

4. The multiband equalizer according to claim 2, wherein the high-frequency component functioning as an equalizer includes a continuous time linear equalizer (CTLE).

5. An error rate measurement system, comprising:
the multiband equalizer according to claim 1;
a pulse pattern generation device that generates a pulse pattern and inputs the pulse pattern as a test signal to a target under test; and
an error rate measurement device that is disposed at a subsequent stage of the multiband equalizer, and compares a measured signal from the target under test due to an input of the test signal with the test signal to measure an error rate of the measured signal,
wherein the error rate measurement device includes a power supply circuit that inputs a driving power supply signal to the plurality of power supply terminals of the multiband equalizer, and
the measured signal is input to the error rate measurement device via the high-frequency component in which the driving power supply signal is input to the power supply terminal among the plurality of high-frequency components.

6. An error rate measurement device, comprising:
the multiband equalizer according to claim 1;
an error rate measurement unit that is disposed at a subsequent stage of the multiband equalizer, and compares a measured signal from the target under test due to an input of a pulse pattern as a test signal with the test signal to measure an error rate of the measured signal; and
a power supply circuit that inputs a driving power supply signal to the plurality of power supply terminals of the multiband equalizer,
wherein the measured signal is input to the error rate measurement unit via the high-frequency component in which the driving power supply signal is input to the power supply terminal among the plurality of high-frequency components.

7. A path selection method of a multiband equalizer having an input-side transmission circuit having one end at which an input terminal to which a signal is input is formed, and the other end terminated by the input-side termination circuit; an output-side transmission circuit having one end terminated by an output-side termination circuit and the other end at which an output terminal for outputting a signal is formed; a plurality of high-frequency components that are provided in parallel between the input-side transmission circuit and the output-side transmission circuit and have frequency pass characteristics different from each other, each high-frequency component including a power supply terminal to which a driving power supply signal is selectively input from an external power supply circuit; and a transmission path that transmits a signal transmitted through the input side transmission circuit to the output side transmission circuit and that includes only the high-frequency component in which the driving power supply signal is input to the power supply terminal among the plurality of high-frequency components, the method comprising:

a step (S1) of selecting at least one high-frequency component from among the plurality of high-frequency components of the multiband equalizer; and a step (S2) of inputting the driving power supply signal to the power supply terminal that the high-frequency component selected in step (S1) has.

\* \* \* \* \*